(12) United States Patent
Vissiere et al.

(10) Patent No.: US 11,099,029 B2
(45) Date of Patent: Aug. 24, 2021

(54) METHOD FOR ESTIMATING THE MOVEMENT OF A PEDESTRIAN

(71) Applicant: SYSNAV, Vernon (FR)

(72) Inventors: David Vissiere, Paris (FR); Mathieu Hillion, Vernon (FR); Eric Dorveaux, Vernon (FR); Augustin Jouy, Vernon (FR); Marc Grelet, Vernon (FR)

(73) Assignee: SYSNAV, Vernon (FR)

( * ) Notice: Subject to any disclaimer, the term of this patent is extended or adjusted under 35 U.S.C. 154(b) by 290 days.

(21) Appl. No.: 15/766,296

(22) PCT Filed: Oct. 10, 2016

(86) PCT No.: PCT/FR2016/052619
§ 371 (c)(1),
(2) Date: Apr. 5, 2018

(87) PCT Pub. No.: WO2017/060660
PCT Pub. Date: Apr. 13, 2017

(65) Prior Publication Data
US 2018/0292230 A1    Oct. 11, 2018

(30) Foreign Application Priority Data
Oct. 8, 2015  (FR) ...................... 1559591

(51) Int. Cl.
*G01C 22/00* (2006.01)
*G01C 21/20* (2006.01)
(Continued)

(52) U.S. Cl.
CPC ........... *G01C 22/006* (2013.01); *G01C 21/12* (2013.01); *G01C 21/16* (2013.01); *G01C 21/20* (2013.01); *G01C 21/206* (2013.01); *G01P 13/00* (2013.01)

(58) Field of Classification Search
None
See application file for complete search history.

(56) References Cited

U.S. PATENT DOCUMENTS 6,366,855 B1 * 4/2002 Reilly .................. G01C 22/006
                                                        701/472
2009/0254276 A1   10/2009 Faulkner et al.
(Continued)

FOREIGN PATENT DOCUMENTS

EP    1137911 A1   10/2001
WO    01/06214 A1   1/2001

OTHER PUBLICATIONS

Aminian et al., "Spatio-temporal parameters of gait measured by an ambulatory system using miniature gyroscopes", Journal of Biomechanics, vol. 35, pp. 689-699 (Year: 2002).*

(Continued)

*Primary Examiner* — Brent A. Fairbanks
(74) *Attorney, Agent, or Firm* — Womble Bond Dickinson (US) LLP (57) ABSTRACT

The present invention relates to a method for estimating the movement of a walking pedestrian (1), the method being characterised in that it comprises the following steps:
(a) Acquisition, by inertial-measurement means (20) rigidly connected to a lower limb (10) of said pedestrian (1) and positioned in such a way as to have substantially a movement of rotation with respect to a distal end (11) of said lower limb (10) at least when said distal end (11) of the lower limb (10) is in contact with the ground, of an acceleration and of an angular speed of said lower limb (10);
(b) Estimation, by data-processing means (21, 31, 41), of a speed of said lower limb (10) according to said measured acceleration and said measured angular speed.

(Continued)

(c) Determination of a time interval of said walking of the pedestrian (1) during which said distal end (11) of said lower limb (10) is in contact with the ground according to the measured acceleration, the measured angular speed, and a moment arm between the inertial-measurement means (20) and said distal end (11);

(d) In said determined time interval:
  calculation of an expected speed according to said measured angular speed and said moment arm;
  Correction of the estimated speed according to the expected speed;

(e) Estimation of the movement of the pedestrian (1) according to the estimated speed.

18 Claims, 6 Drawing Sheets

(51) Int. Cl.
  *G01C 21/12* (2006.01)
  *G01C 21/16* (2006.01)
  *G01P 13/00* (2006.01)

(56) References Cited

U.S. PATENT DOCUMENTS

| | | | |
|---|---|---|---|
| 2013/0123665 A1 | 5/2013 | Mariani et al. | |
| 2013/0131555 A1* | 5/2013 | Hook | A61B 5/0022 600/595 |
| 2013/0324890 A1* | 12/2013 | Youssef | G01C 22/006 600/595 |
| 2014/0337450 A1* | 11/2014 | Choudhary | A61B 5/1118 709/206 |

OTHER PUBLICATIONS

"French search report," FR Application No. 1559592 (dated Jul. 12, 2016) with English translation cover sheet.

International Search Report and Written Opinion received for PCT Patent Application No. PCT/FR2016/052619, dated Jan. 12, 2017, 17 pages (8 pages of English Translation and 9 pages of Original Document).

International Preliminary Report on Patentability received for PCT Patent Application No. PCT/FR2016/052619, dated Apr. 19, 2018, 15 pages (8 pages of English Translation and 7 pages of Original Document).

Foxlin, Eric, "Pedestrian tracking with shoe-mounted inertial sensors", IEEE Computer Graphics and Applications, 2005, pp. 38-46.

* cited by examiner

METHOD FOR ESTIMATING THE MOVEMENT OF A PEDESTRIAN

The present invention relates to the field of navigation without GPS.

More precisely, it relates to a method for estimating the movement of a walking pedestrian via magneto-inertial techniques.

PRIOR ART

It is common today for a pedestrian to monitor the pedestrian's position via GPS or by using a communication network (triangulation using emitter terminals, a WiFi network or others). It is possible to associate therewith other sensors in order to improve the positioning for example barometric sensors, magnetic-field sensors, image sensors, radar sensors, etc.

These methods are very limited since they do not work inside, in tunnels, or too far from the emitters, and are dependent on outside technologies such as GPS satellites that can be unavailable or even voluntarily scrambled.

Alternatively, "autonomous" methods are also known, for monitoring, in any environment, the relative movement of a heavy vehicle such as a fighter aircraft or airliner, a submarine, a ship, etc., via an inertial or magneto-inertial measurement unit. Relative movement means the trajectory of the vehicle in space with respect to a point and a reference frame given upon initialisation. In addition to the trajectory, these methods also allow the orientation of the vehicle with respect to the same initial reference frame to be obtained.

An inertial measurement unit consists at minimum of three accelerometers and of three gyrometers positioned in a three-axis reference system. Typically, the gyrometers "maintain" a reference frame, in which a double integration, over time, of the measurements of the accelerometers allows the movement to be estimated.

It is namely known that in order to be able to use the conventional inertial-navigation methods, as implemented in heavy uses such as the navigation of fighter airplanes or airliners, submarines, ships, etc., it is necessary to use sensors with very high precision. Indeed, the double integration, over time, of a measurement of acceleration means that a constant error in acceleration creates an error in position that increases proportionally to the square of time.

And these high-precision sensors are too heavy, too bulky and too expensive to be carried by a pedestrian.

In order to be able to estimate a trajectory with light, low-cost inertial sensors like those used in mobile telephones for example, different methods that do not require the integration of the inertial sensors over long periods of time must be implemented.

A first very widespread method involves counting the steps taken. The detection of each step is carried out by identifying a pattern characteristic of a step in the inertial measurements. An estimation of the direction of the step is obtained separately from the speed or from the distance, for example by orientation with respect to Earth's magnetic north using sensors sensitive to the magnetic field. In numerous locations, strong magnetic disturbances make the determination of the Earth magnetic heading imprecise. These disturbances are particularly frequent inside buildings because of the presence of magnetic materials for example in the furniture, the walls, electric facilities and various objects, etc.

For this reason, complementary methods for orientation despite these disturbances have been proposed. Moreover, it is routine to associate an attitude filter, for example of the extended Kalman type, in order to combine the measurements of magnetic field and the inertial measurements. This allows the precision of the orientation, and in particular of the heading, to be improved.

After each step, the estimated position of the carrier is updated by carrying out a movement of the estimated length of a step in the direction of the walking estimated on the basis of the heading calculated by the inertial measurement unit.

This method was used by attaching the inertial measurement unit to various locations on an individual, for example to the foot, to the belt, in a pocket, to the wrist, to the hand, onto the glasses, onto the forehead, etc.

The performance obtained is limited by the imprecise estimation of the length of the step and the difference between the heading and the direction of the walking. This estimation can be improved via a harmonisation of the reference frames and by linking, via a model, the length and the frequency of the steps. Nevertheless, a significant uncertainty remains since a pedestrian never has two steps having an exactly identical length and since a pedestrian performs various indistinguishable types of walking with steps having a variable length, no model is satisfactory at present.

A second method involves integrating the measurements of acceleration and of angular speed over very short periods of time in order to determine the trajectory of the inertial measurement unit and thus of the carrier of the measurement unit. This method does not require an estimation of the length of a step but is limited by the accumulation of the integration errors that have already been mentioned. For MEMS sensors, this manifests itself as an error of the same order of magnitude as the length of a step after several seconds.

One solution proposed in the literature ("Pedestrian tracking with shoe-mounted inertial sensors. Computer Graphics and Applications", Foxlin, E., 2005) involves reinitialising the calculated speed when it is known that it is zero, a method often called ZUPT (Zero velocity UPdaTe). The foot in particular has a zero speed in contact with the ground. Thus, by placing the inertial measurement unit on the shoe and by detecting the phase in which the foot is in contact with the ground, it is possible to reset the speed at zero. The integration of the acceleration is then necessary only during the phase in which the foot is in the air, a phase that lasts approximately one second. As soon as the foot is on the ground, the speed is known and equal to zero.

In order to improve this method, it is possible to use an estimation filter for example a Kalman filter, a non-linear filter or any other filter to combine the information of the various sensors. This filter can for example comprise a state with 6 degrees of freedom for the speed and the attitude. Other states can be added for example the position, the bias of the sensors, etc. The filter also gives a measurement of the uncertainty of the states estimated with a covariance matrix. This allows the measurements of additional sensors for which an estimation of the uncertainty is also available to be easily combined. These can be measurements of absolute or relative position.

During the phase of ZUPT, the update of the states of the filter is progressive and optionally corrects all the states and not only the speed.

The ZUPT method thus allows the quality of the estimation of the movement to be improved, but poses a certain number of additional problems due to the not very practical position of the sensor on the foot. This makes it very sensitive to impacts (to be adjusted according to the type of sole), not very pleasing in terms of appearance and uncomfortable since it must be integrated into the shoe. Moreover, the heading is difficult to determine near the ground with the presence of parasite magnetic fields and the shoe itself often consists of magnetic materials. Finally, the problem of running is posed, for which the phase during which the foot is immobile on the ground is very short, or even zero, which prevents the correction of the states of the filter.

In parallel, it is desirable to estimate the movement of the lower limbs in order to characterise certain disorders.

Like in the navigation applications, the known methods (see the application US 2013123665) propose estimating the trajectory of a foot and thus the gait of the carrier on the basis of the inertial measurements acquired by a device once again positioned on the foot, with the same difficulties as a result. Thus, the study of the gait with such devices is limited to occasional studies in a research centre or during a specific activity such as a sports training session, because of the size and the non-practical nature of the sensor on the foot.

It would be desirable to have a new method, for estimating the movement of a pedestrian, that has better quality than that of the current methods and is not limiting.

PRESENTATION OF THE INVENTION

The present invention thus relates, according to a first aspect, to a method for estimating the movement of a walking pedestrian, the method being characterised in that it comprises the following steps:
  (a) Acquisition, by inertial-measurement means rigidly connected to a lower limb of said pedestrian and positioned in such a way as to have substantially a movement of rotation with respect to a distal end of said lower limb, of an acceleration and of an angular speed of said lower limb;
  (b) Estimation, by data-processing means, of a speed of said lower limb according to said measured acceleration and said measured angular speed.
  (c) Determination, by the data-processing means, of a time interval of said walking of the pedestrian during which said distal end of said lower limb is in contact with the ground according to the measured acceleration, the measured angular speed, and a moment arm between the inertial-measurement means and said distal end;
  (d) In said determined time interval:
    Calculation, by the data-processing means, of an expected speed of said lower limb according to said measured angular speed and said moment arm;
    Correction of the estimated speed and/or of the estimated orientation of said lower limb according to the expected speed;
  (e) Estimation, by the data-processing means, of the movement of the pedestrian according to the estimated speed of said lower limb.

According to other advantageous and non-limiting features:
  the speed of said lower limb is estimated by integration of the measured acceleration expressed in the terrestrial reference frame according to the measured angular speed, and the movement of said lower limb is estimated by integration of the estimated speed;
  said expected speed is given by the formula $\vec{v}_{att} = \vec{\omega} \wedge \vec{r}$, where $\vec{\omega}$ is the measured angular speed and $\vec{r}$ is the moment arm;

said inertial-measurement means are positioned on said lower limb between an ankle and a knee;
  step (c) comprises the calculation, by the data-processing means, of an expected acceleration according to said measured angular speed and the moment arm, said time interval of said walking of the pedestrian during which said distal end of said lower limb is in contact with the ground being determined according to the measured acceleration and said expected acceleration;
  said time interval of said walking of the pedestrian during which said distal end of said lower limb is in contact with the ground is determined in step (c) as that during which a difference between the measured acceleration and the expected acceleration is less than a predetermined threshold;
  said expected acceleration is given by the formula $$\vec{\gamma}_{att} = -\vec{g} + \frac{d\vec{\omega}}{dt} \wedge \vec{r} + \vec{\omega} \wedge \vec{\omega} \wedge \vec{r},$$

where $\vec{\omega}$ is the measured angular speed, $\vec{r}$ the moment arm and the acceleration of gravity;
  said time interval of said walking of the pedestrian during which said distal end of said lower limb is in contact with the ground is determined in step (c) as that during which the measured acceleration and/or the measured angular speed correspond to a predetermined pattern representative of the contact of the end of the lower limb with the ground;
  the correction of an estimated speed of said lower limb in step (c) comprises the implementation of a filter that estimates a linear or non-linear state;
  the method comprises a prior step (a0) of determining said moment arm;
  the moment arm is determined by minimising the difference between the measured acceleration and an expected acceleration dependent on said measured angular speed and the moment arm, during a predetermined time interval of said walking of the pedestrian during which said distal end of said lower limb is in contact with the ground;
  said determination of the moment arm comprises the integration of the moment arm into the filter that estimates a linear or non-linear state;
  the method comprises a subsequent step (f) of analysis, by the data-processing means, of the estimated movement in order to identify a disorder in the walking of said pedestrian.

According to a second aspect, the invention relates to a piece of equipment for estimating the movement of a walking pedestrian, characterised in that it comprises data-processing means configured to implement:
  A module for receiving an acceleration and an angular speed of a lower limb of said pedestrian acquired by inertial-measurement means rigidly connected to said lower limb and positioned in such a way as to have substantially a movement of rotation with respect to a distal end of said lower limb;
  A module for estimating a speed of said lower limb according to said measured acceleration and said measured angular speed;
  A module for determining a time interval of said walking of the pedestrian during which said distal end of said lower limb is in contact with the ground according to the measured acceleration, the measured angular speed, and a moment arm between the inertial-measurement means and said distal end;

A module for calculating, in said determined time interval, an expected speed of said lower limb according to said measured angular speed and said moment arm;

A module for correcting, in said time interval, the estimated speed of said lower limb according to the expected speed;

A module for estimating the movement of the pedestrian according to the estimated speed of said lower limb.

According to other advantageous and non-limiting features:

The piece of equipment is a case comprising the inertial-measurement means;

The piece of equipment further comprises means for attaching the case to the lower limb, a magnetometer, and communication means.

The piece of equipment is a mobile terminal or a server, suitable for communicating with a case comprising the inertial-measurement means.

According to a third aspect, the invention relates to a system comprising the piece of equipment according to the second aspect of the invention and at least one connected case.

According to a fourth and a fifth aspect, the invention relates to a computer program product comprising code instructions for the execution of a method for estimating the movement of a walking pedestrian according to the first aspect of the invention; and a storage means readable by a piece of computer equipment on which a computer program product comprises code instructions for the execution of a method for estimating the movement of a walking pedestrian according to the first aspect of the invention.

PRESENTATION OF THE DRAWINGS

Other features and advantages of the present invention will be clear upon reading the following description of a preferred embodiment. This description will be given in reference to the appended drawings in which.

DETAILED DESCRIPTION

Estimation of a Movement

The present invention relates to a method for estimating the movement of a walking pedestrian 1.

The notion of "estimation of a movement" must be understood in the broad sense.

Indeed, in a first use, that which can define the movement (and thus which is estimated) is the overall displacement of the pedestrian. This allows, for example, the position of the pedestrian on a map to be monitored, the distance covered to be determined, etc., in particular for navigation without GPS, personal monitoring, etc.

In a second use, that which can define the movement is, on the contrary, the gait of the pedestrian, in particular the trajectory of the foot. This is useful in particular for medical purposes.

Architecture

Figure 1:
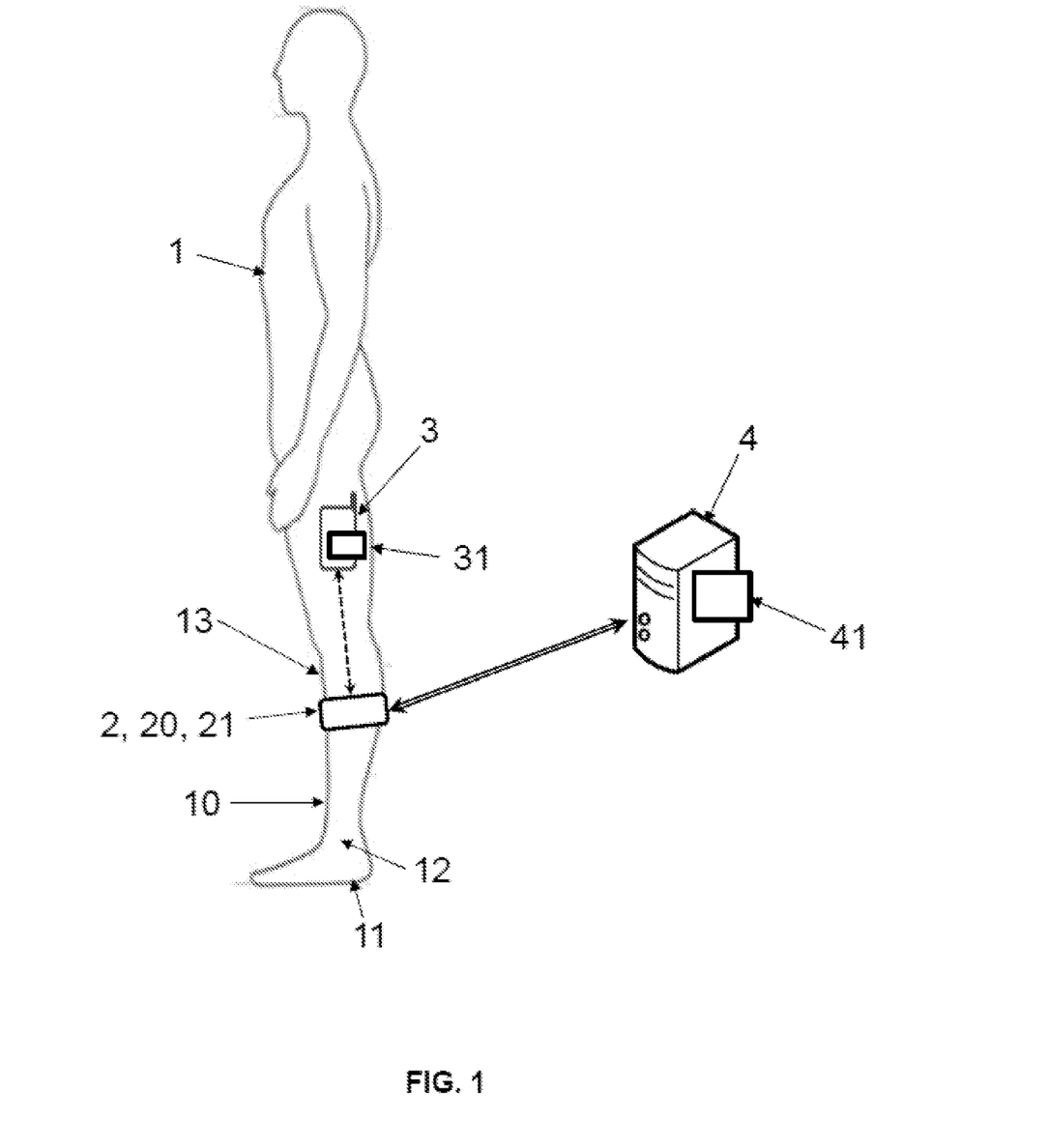
FIG. 1 is a diagram of equipment for the implementation of the method according to the invention.

In reference to FIG. 1, the pedestrian has at least one lower limb 10 (i.e. a leg) provided with inertial-measurement means 20. It is understood that each of the two lower limbs 10 of the pedestrian 1 can be provided with inertial-measurement means 20.

More precisely, the inertial-measurement means 20 are rigidly connected to this lower limb 10, i.e. they have a movement substantially identical in the terrestrial reference frame, as will be seen below. The inertial-measurement means are advantageously more precisely positioned in the region called crural region of the lower leg 10, that is to say, the lower half that extends between an ankle 12 and a knee 13 of the pedestrian (inclusive), and in general any location having, when a distal end 11 of the lower limb 10 (i.e. the heel of the foot) is in contact with the ground (and advantageously permanently), substantially only a movement of rotation with respect to this distal end 11 of the lower limb 10, that is to say because of a moment arm. Thus, when the heel of the foot 11 is set down, the means 20 can almost only rotate in the terrestrial reference frame, and not translate.

The interest of such positioning will be shown below. In summary, the means 20 are typically positioned at a tibia of the pedestrian 1, since by definition any point of the tibia is only articulated with the foot via the ankle 12, and thus their relative movement can only be a rotation, but it is understood that they can also be on the thigh. Indeed, during a step, when the heel of the foot 11 is placed on the ground, the entire lower limb 10 is rigid (it is indeed physiologically necessary to extend the leg on which a person bears during a step, otherwise there is discomfort and inefficiency in the walking). Because of this rigidity of the lower limb during this bearing phase, there is indeed a pure movement of rotation between the points of the thigh and the distal end 11 of the limb 10. It is understood that during bearing on the other lower limb, there is no longer necessarily pure rotation between the thigh and the foot 11 of the lower limb 10 in question, but this is not important since the foot 11 is "in the air" as will be shown below. Finally, it is to be noted that of course the means 20 will not be positioned on the foot 11, since this is precisely the position that it is desired to avoid because of the inconvenience it causes. In all cases, the points of the foot 11 do not have a movement of rotation when the latter is on the ground and the means 20 cannot therefore be positioned there.

The distance between the point of rotation of the distal end 11 and the means 20 is called, in the rest of the present description, "moment arm". And the vector representing this moment arm oriented from the end 11 to the means 20 is noted as $\vec{r}$.

Figure 2:
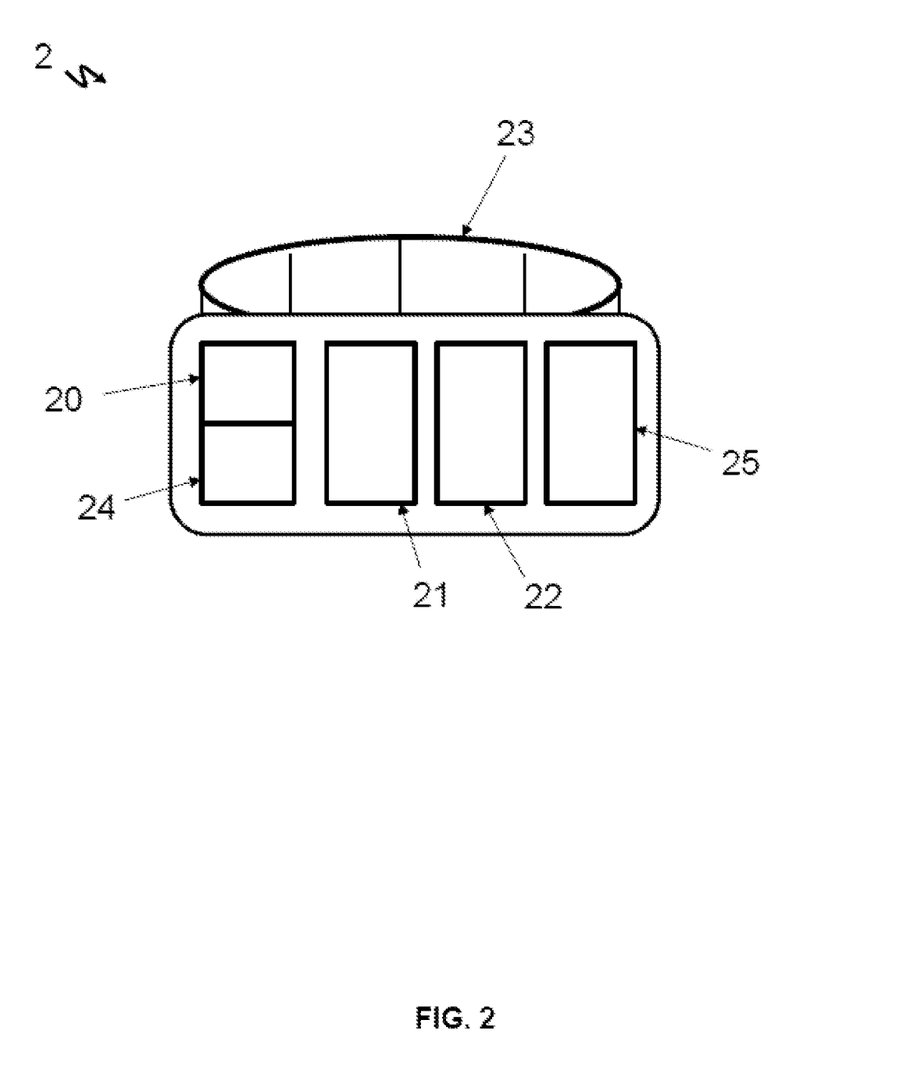
FIG. 2 shows, in more detail, an example of a case for the implementation of the method according to the invention.

The inertial-measurement means 20 are preferably those of a case 2 as shown in FIG. 2 having means 23 for attachment to the lower limb 10. These attachment means 23 consist for example of a bracelet for example having a hook-and-loop fastener strip that surrounds the limb and allows the rigid connection. As will be shown below, it is indeed desirable for the inertial-measurement means 20 to be positioned as close as possible to the knee 13 and to not be able to move along the limb 10.

Inertial-measurement means 20 mean an inertial measurement unit comprising at least three accelerometers and three gyrometers positioned in a three-axis reference system. The gyrometers measure the instantaneous angular speed of the inertial measurement unit with respect to the terrestrial reference frame, noted as $\vec{\omega}$. The accelerometers are sensitive to the outside forces other than gravitational forces applied to the sensor, and allow an acceleration noted as $\vec{\gamma}$ to be measured. As will be seen, the means 20 are advantageously accompanied by at least one magnetometer 24 in order to form means 20, 24 for magneto-inertial measurement. The magnetometer 24 measures a field noted as $\vec{B}$. Such a magnetometer 24 is useful for indicating a heading of the pedestrian (i.e. a direction in a horizontal plane), in particular upon starting since as explained the movement is relative. The magnetometer 24 is then no longer indispensable but can be used to reorient the heading that deviates after the accumulation of errors related to the measurements of angular speed.

The case 2 can comprise processing means 21 (typically a processor) for the implementation of the processing of the present method directly in real time, or the measurements can be emitted via communication means 25 to an outside device such as a mobile terminal (smartphone) 3, or even a remote server 4, or the measurements can be recorded in local data-storage means 22 (a memory for example of the flash type) local memory for a posteriori processing for example in the server 4.

The communication means 25 can implement short-range wireless communication for example Bluetooth or WiFi (in particular in an embodiment with a mobile terminal 3) or even be means for connecting to a mobile network (typically UMTS/LTE) for long-distance communication. It should be noted that the communication means 25 can be for example a wired connection (typically USB) for transferring the data from the local data-storage means 22 to those of a mobile terminal 3 or of a server 4.

If it is a mobile terminal 3 (or a server 4) that hosts "the intelligence", it comprises processing means 31 (or 41) such as a processor for the implementation of the processing of the present method that will be described. When the processing means used are those 21 of the case 2, the latter can also include communication means 25 for transmitting the estimated position. For example, the position of the carrier can be sent to the mobile terminal 3 in order to display the position in an interface of a piece of navigation software.

In the rest of the present description, it will be shown that the data-processing means 21, 31, 41 of the case 2, of a smartphone 3 and of a remote server 4, respectively, can carry out, indifferently and according to the uses, all or part of the steps of the method.

Principle and Notation

In a first step (a), the method comprises the acquisition, by the inertial-measurement means 20, of the acceleration $\vec{\gamma}$ and of the angular speed $\vec{\omega}$ of said lower limb 10. It is noted that in the rest of the description, when acceleration/speed/position of the lower limb 10 are mentioned, it is understood that this is at the inertial-measurement means 20.

These values are advantageously measured with dt sampling (i.e. every "dt" seconds) with dt very small with respect to the characteristic time of the movements of the pedestrian 1, typically 40 ms.

The orientation of the means 20 with respect to the terrestrial inertial reference frame can be given for example by a rotation matrix (noted as R), an attitude quaternion (noted as q), the attitude is a synonym of orientation in space or of the Euler angles (roll $\varphi$, pitch $\theta$, yaw $\psi$). These three representations are equivalent, and thus they are used indifferently in this document. The speed and the position of the means 20 (and thus of the lower limb 10) are noted as $\vec{v}$ and $\vec{d}$, respectively, and are estimated by a simple and a double integration, respectively, of the acceleration in the terrestrial reference frame, which as will be seen below is calculated on the basis of the measured acceleration $\vec{\gamma}$ (given in the mobile reference frame of the inertial-measurement means 20) and the orientation of the means 20 with respect to the terrestrial reference frame (updated on the basis of the measurements of angular speed).

The initialisation of the attitude can be carried out for example on the basis of the measurements of acceleration (and if necessary the measurements of a possible magnetometer 24) while considering that the limb 10 and thus the means 20 are immobile upon starting and that the magnetic field is equal to the Earth's magnetic field. In this case, the measured acceleration is equal to the opposite of the gravitational field $\vec{\gamma} = -\vec{g}$. The roll and pitch are thus given by the following formulas:

$$\varphi = -\tan^{-1}\frac{\gamma_y}{\gamma_z}$$

$$\theta = \sin^{-1}\frac{\gamma_x}{\sqrt{\gamma_x^2 + \gamma_y^2 + \gamma_z^2}}$$

The magnetic heading can then be calculated on the basis of the measurement of magnetic field with the formula:

$$\psi = \tan^{-1}\frac{B_z \cdot \sin\varphi - B_y \cdot \cos\varphi}{B_x \cdot \cos\theta + B_y \cdot \sin\theta \cdot \sin\varphi + B_z \cdot \sin\theta \cdot \cos\varphi}$$

The formula giving the matrix for going from the terrestrial reference frame to the reference frame of the means 20 on the basis of the Euler angles is:

$$R_{i\to b} = \begin{bmatrix} \cos\theta \cdot \cos\psi & -\cos\theta \cdot \sin\psi & \sin\theta \\ \cos\psi \cdot \sin\theta \cdot \sin\varphi + \cos\varphi \cdot \sin\psi & \cos\varphi \cdot \cos\psi - \sin\theta \cdot \sin\varphi \cdot \sin\psi & -\cos\theta \cdot \sin\varphi \\ \sin\varphi \cdot \sin\psi - \cos\varphi \cdot \cos\psi \cdot \sin\theta & \cos\psi \cdot \sin\varphi + \cos\varphi \cdot \sin\theta \cdot \sin\psi & \cos\theta \cdot \cos\varphi \end{bmatrix}$$

The speed and the position of the means 20 with respect to the terrestrial reference frame are initialised to zero. The initial position cannot be determined directly on the basis of the measurements of accelerometers, gyrometers and magnetometers, it can be provided by another sensor (for example GPS) or indicated by the user. Thus, over time, the relative position of the device 2 (and thus of the pedestrian 1), defined with respect to the initial position, is known with only the inertial (and if necessary magnetic) sensors.

The terrestrial inertial reference frame is designated by the index i and the reference frame of the means 20 also called body is designated by the index b. Thus, the matrix for changing basis from the terrestrial inertial reference frame to the measurement unit reference frame is noted as $R_{i\to b}$. $\hat{R}_n$ designates the estimation of this matrix after n sample steps.

The attitude is related to the angular speed $\vec{\omega}$ according to the differential equation over the transformation matrix $R_{i\to b}$. The coordinates of $\omega$ are expressed in the basis of the inertial measurement unit.

$$R_{i \to b} = \begin{bmatrix} 0 & -\omega_{bz} & \omega_{by} \\ \omega_{bz} & 0 & -\omega_{bx} \\ -\omega_{by} & \omega_{bx} & 0 \end{bmatrix} \cdot R_{i \to b}$$

When considering that the period of the sampling noted as dt is sufficiently small, a first-degree approximation can for example be used:

$$R_{i \to b}(t+dt) = R_{i \to b}(t) + \dot{R}_{i \to b}(t) \cdot dt$$

This approximation can be used to update the estimation of the matrix $\hat{R}_n$ for each measurement:

$$\hat{R}_{n+1} = \hat{R}_n + \begin{bmatrix} 0 & -\omega_z & \omega_y \\ \omega_z & 0 & -\omega_x \\ -\omega_y & \omega_x & 0 \end{bmatrix} \cdot \hat{R}_n \cdot dt$$

In order to update the position and the speed, the measurement of the acceleration is used. In particular, the method conventionally comprises a step (b) of estimating the speed according to said measured acceleration (in practice via integration) and a step (e) of estimating the movement according to the estimated speed (in practice also via integration).

Thus, the acceleration of the means 20 with respect to the terrestrial reference frame is given by:

$$\vec{a} = \vec{\gamma} + \vec{g}$$

And the approximation giving the speed according to the acceleration is:

$$\vec{v}(t+dt) = \vec{v}(t) + \vec{a}(t) \cdot dt$$

And the estimation of the speed is thus updated for each measurement according to:

$$\hat{v}_{n+1} = \hat{v}_n + \hat{a}_n \cdot dt$$

The measurement of the accelerometer is known in the reference frame of the means 20 body while the gravitational field is known in the terrestrial reference frame, the expression of the acceleration in the terrestrial reference frame is therefore:

$$\begin{bmatrix} a_{ix} \\ a_{iy} \\ a_{iz} \end{bmatrix} = R_{b \to i} \cdot \begin{bmatrix} \gamma_{bx} \\ \gamma_{by} \\ \gamma_{bz} \end{bmatrix} + \begin{bmatrix} 0 \\ 0 \\ -g \end{bmatrix}$$

Thus, if the speed is expressed in the basis of the terrestrial reference frame, the update formula at the $n^{th}$ step of the sample is:

$$\begin{bmatrix} \hat{v}_{ix,n+1} \\ \hat{v}_{iy,n+1} \\ \hat{v}_{iz,n+1} \end{bmatrix} = \begin{bmatrix} \hat{v}_{ix,n} \\ \hat{v}_{iy,n} \\ \hat{v}_{iz,n} \end{bmatrix} + \left( \hat{R}_n^{-1} \cdot \begin{bmatrix} \gamma_{bx,n} \\ \gamma_{by,n} \\ \gamma_{bz,n} \end{bmatrix} + \begin{bmatrix} 0 \\ 0 \\ -g \end{bmatrix} \right) \cdot dt$$

And if the speed is expressed in the basis of the reference frame of the measurement unit, the update formula at the $n^{th}$ step of the sample is:

$$\begin{bmatrix} \hat{v}_{bx,n+1} \\ \hat{v}_{by,n+1} \\ \hat{v}_{bz,n+1} \end{bmatrix} = \hat{R}_{n+1} \cdot \hat{R}_n^{-1} \cdot \begin{bmatrix} \hat{v}_{bx,n} \\ \hat{v}_{by,n} \\ \hat{v}_{bz,n} \end{bmatrix} + \hat{R}_{n+1} \cdot \left( \hat{R}_n^{-1} \cdot \begin{bmatrix} \gamma_{bx,n} \\ \gamma_{by,n} \\ \gamma_{bz,n} \end{bmatrix} + \begin{bmatrix} 0 \\ 0 \\ -g \end{bmatrix} \right) \cdot dt$$

Which becomes, after substitutions and with a degree of 1 in dt:

$$\begin{bmatrix} \hat{v}_{bx,n+1} \\ \hat{v}_{by,n+1} \\ \hat{v}_{bz,n+1} \end{bmatrix} = \begin{bmatrix} \hat{v}_{bx,n} \\ \hat{v}_{by,n} \\ \hat{v}_{bz,n} \end{bmatrix} +$$

$$\left( \begin{bmatrix} 0 & -\omega_z & \omega_y \\ \omega_z & 0 & -\omega_x \\ -\omega_y & \omega_x & 0 \end{bmatrix} \cdot \begin{bmatrix} \hat{v}_{bx,n} \\ \hat{v}_{by,n} \\ \hat{v}_{bz,n} \end{bmatrix} + \begin{bmatrix} \gamma_{bx,n} \\ \gamma_{by,n} \\ \gamma_{bz,n} \end{bmatrix} + \hat{R}_n \cdot \begin{bmatrix} 0 \\ 0 \\ -g \end{bmatrix} \right) \cdot dt$$

Finally, the estimation of the position is updated according to:

$$\begin{bmatrix} \hat{d}_{ix,n+1} \\ \hat{d}_{iy,n+1} \\ \hat{d}_{iz,n+1} \end{bmatrix} = \begin{bmatrix} \hat{d}_{ix,n} \\ \hat{d}_{iy,n} \\ \hat{d}_{iz,n} \end{bmatrix} + \begin{bmatrix} \hat{v}_{ix,n} \\ \hat{v}_{iy,n} \\ \hat{v}_{iz,n} \end{bmatrix} \cdot dt$$

Preferably, with an extended Kalman filter (this will be discussed below), the covariance matrix is updated by linearising the above formulas around the current point.

Foot on the Ground Condition

The present method astutely uses the condition "foot on the ground" on which the ZUPT method is based, but without the requirement of having the sensor on the foot.

Figure 3A:
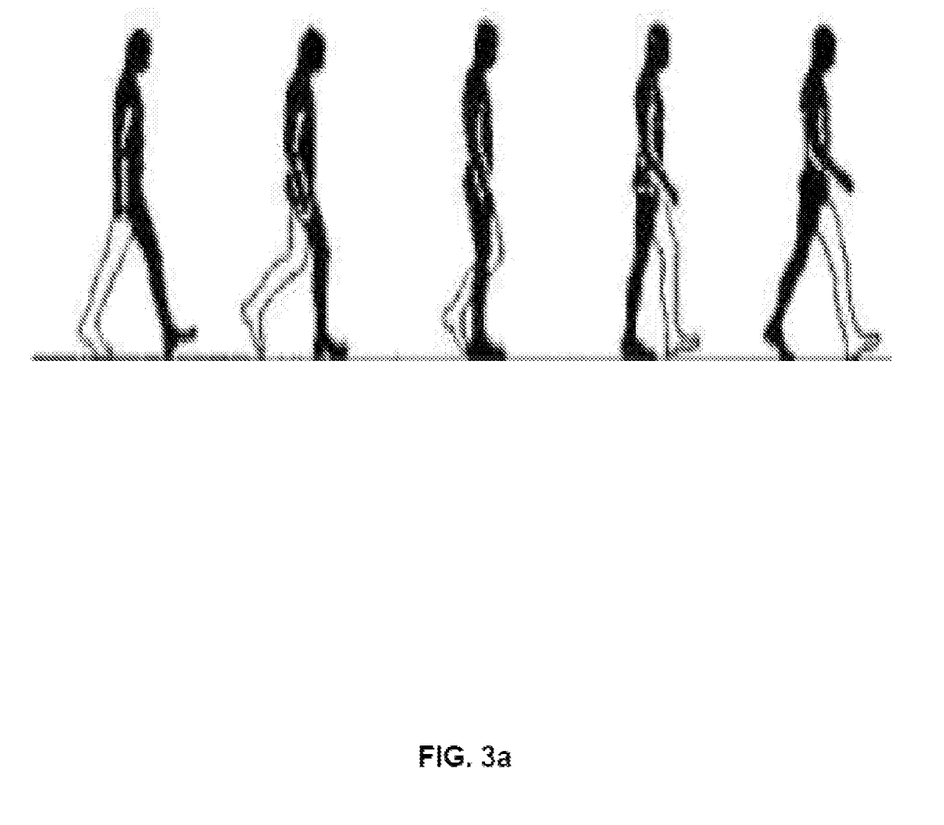
FIGS. 3a-3b schematically show successive steps during a phase of placing the foot in contact with the ground.

As visible in FIG. 3a, the black foot in contact with the ground has a zero speed in the phase shown for steps 2 to 4. The inertial-measurement means 20 as shown in FIG. 2 were static when the foot is on the ground in the ZUPT method (and thus it was possible to reinitialise the speed)

Figure 3B:
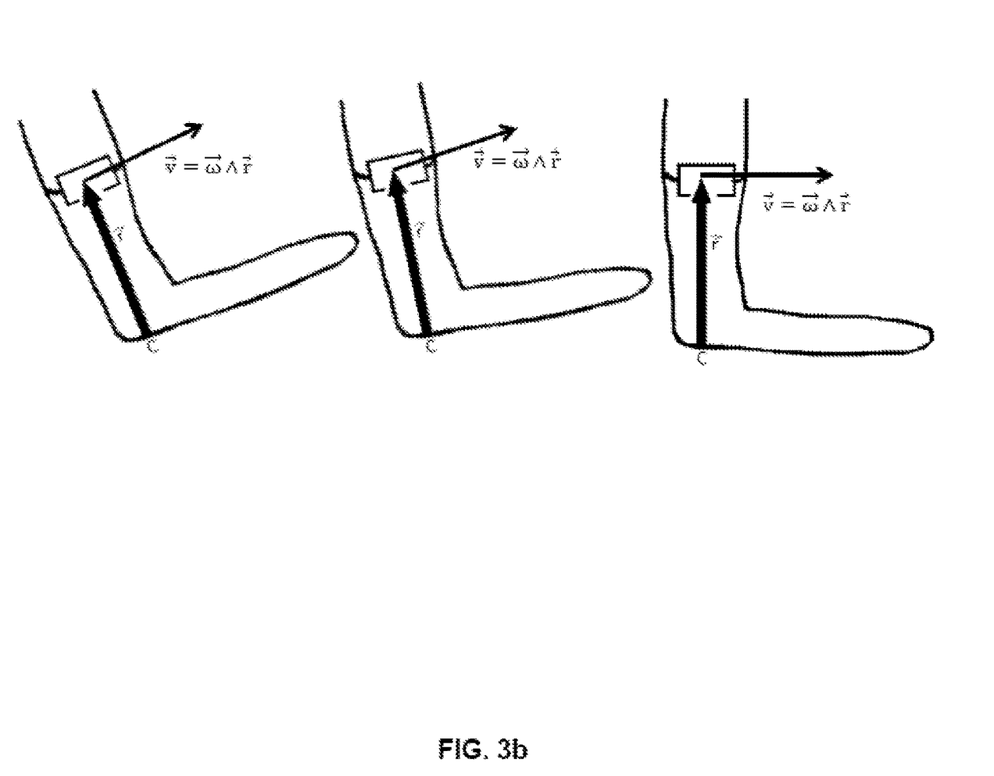

FIG. 3b now shows a possible position of the inertial-measurement means 20 (FIG. 2) above the ankle 12 (FIG. 1) during the phase of heel/ground contact. In the case of the present method, the inertial-measurement means 20 carry out a rotation at least during this foot on the ground phase, and thus have an "expected speed" of the means 20 (i.e. of said lower limb 10) (FIG. 1) that allows a reset. Said expected speed is dependent on the measured angular speed and said moment arm, in particular is calculated on the basis of the model leg in rotation about the end 11 (FIG. 1) stationary on the ground. It is then equal to the vector product between the instantaneous rotation vector $\vec{\omega}$ and the vector $\vec{r}$:

$$\vec{v} = \vec{\omega} \wedge \vec{r}$$

One difficulty with respect to the ZUPT method is to be able to determine a time interval of said walking of the pedestrian 1 during which said distal end 11 of said lower limb 10 is in contact with the ground, and more precisely the moment at which the movement is a pure rotation and the model giving the speed is correct.

For this, a step (c) allows this time interval of contact with the ground to be determined on the basis of the measured acceleration, the measured angular speed, and the supposed or estimated moment arm. This explains why it is not indispensable for the means 20 to have substantially a movement of rotation with respect to the distal end 11 of the lower limb 10 when it is not in contact with the ground In a first embodiment, this step (c) comprises the calculation, by the data-processing means 21, 31, 41, of an "expected acceleration" according to said measured angular speed and the moment arm.

Indeed, with the same model that supposes the means 20 in rotation at the distance r (i.e. the length of the moment arm) from the stationary point 11, the theoretical acceleration is equal to:

$$\vec{a_{att}} = \frac{d\vec{\omega}}{dt} \wedge \vec{r} + \vec{\omega} \wedge \vec{\omega} \wedge \vec{r}$$

By adding the term due to the gravitational field, the measurement of expected acceleration is equal to:

$$\vec{\gamma_{att}} = -\vec{g} + \frac{d\vec{\omega}}{dt} \wedge \vec{r} + \vec{\omega} \wedge \vec{\omega} \wedge \vec{r}$$

This relationship gives a criterion for determining whether the moment arm model is correct, and the step (c) comprises the determination of the time interval of contact with the ground according to the measured acceleration and said theoretical acceleration.

More precisely, the model is considered to be valid when the difference between the expected measurement of the acceleration and the measurement made by the inertial-measurement means 20 is zero:

$$\vec{Ecart} = \vec{\gamma} - \vec{\gamma_{att}} = \vec{\gamma} + \vec{g} - \frac{d\vec{\omega}}{dt} \wedge \vec{r} - \vec{\omega} \wedge \vec{\omega} \wedge \vec{r}$$

The gravitational field is known in the terrestrial reference frame, while the measurements of the gyrometer and of the accelerometer, as well as $\vec{r}$, are known in the basis of the inertial measurement unit. In order to calculate the vector difference, a change of basis must therefore be carried out. In order to not be dependent on the change of basis matrix, the norms of the vectors can be compared $$Ecart = \left|\vec{\gamma} - \frac{d\vec{\omega}}{dt} \wedge \vec{r} - \vec{\omega} \wedge \vec{\omega} \wedge \vec{r}\right| - |\vec{g}|$$

The term $$\frac{d\vec{\omega}}{dt} \wedge \vec{r}$$

is in general small with respect to the other terms, it is therefore possible, in order to avoid having to calculate the derivative of the angular speed, to ignore it. The formula for the difference is therefore simplified:

$$Ecart = |\vec{\gamma} - \vec{\omega} \wedge \vec{\omega} \wedge \vec{r}| - |\vec{g}|$$

This difference is in practice not exactly zero, and the period during which it is smaller than a predetermined threshold, for example 10% of $|\vec{g}|$, is selected. In other words, said time interval of said walking of the pedestrian 1 during which said distal end 11 of said lower limb 10 is in contact with the ground is determined in step (c) as that during which a difference between the measured acceleration and the theoretical acceleration is less than this predetermined threshold.

Alternatively, in a second embodiment, the phase of contact with the ground can be roughly sought on the basis of a characteristic pattern in the signal of the sensors. The rotation of the leg during the swinging or the impact when the foot touches the ground for example can allow said interval of contact with the ground to be approximately determined. For example, when the acceleration of an impact is detected, it can be decided that during a characteristic period of time (for example a quarter of a second) after this detection, the foot is on the ground.

Alternatively, in a previous phase of calibration, the conventional values of acceleration and of angular speed corresponding to a contact of the foot with the ground can be measured, these conventional values (at a point or over an interval) forming the reference pattern, and the intervals of time that minimise the difference between the measured values and this reference pattern can be identified.

In all cases, in said interval, the moment at which the difference defined on the basis of the acceleration is minimal can thus be sought. In this way, the best moment to carry out the reset is identified. For example, an alternative method based on a predetermined pattern can be used to roughly identify the interval of contact with the ground, and then the difference between the measured acceleration and the expected acceleration in this interval can be minimised (i.e. using the main method described above).

In said determined time interval (and preferably at the point identified in this interval), a step (d) allows the resetting of the estimated speed.

More precisely, said expected speed of the lower limb 10 is calculated by the data-processing means 21, 31, 41 according to said measured angular speed and said moment arm. In particular, as explained, it is equal to the vector product of the instantaneous rotation vector $\vec{\omega}$ and the vector $\vec{r}$:

$$\vec{v_{att}} = \vec{\omega} \wedge \vec{r}$$

The estimated speed of said lower limb 10 is thus corrected according to the expected speed.

The difference between this expected speed and the estimated speed $\hat{v}$ obtained via successive integrations is used for the resetting. It is possible to reset by simply replacing the value of the estimated speed with the expected speed, but preferably and as explained, a filter that estimates linear state (Luenberger filter, Kalman Filter, etc.) or non-linear state (extended Kalman filter, invariant observer, etc.) is used. In the present description, the example of an extended Kalman filter will be used, but a person skilled in the art will be able to transpose this to other filters.

The Kalman gain $K_{n+1}$ is calculated on the basis of the covariance matrix according to the formula of an extended Kalman filter. The errors caused by the sensors and by the approximations can be modelled as Gaussian noise. The variance is estimated by measuring the noise of the sensors at rest. The resetting of the estimation of the state $\hat{x}_{n+1,n}$ containing the change of basis matrix, the speed and the position is carried out by adding the correction term:

$$\hat{x}_{n+1,n+1} = \hat{x}_{n+1,n} + K_{n+1} \cdot \left( \begin{bmatrix} \omega_x \\ \omega_y \\ \omega_z \end{bmatrix} \wedge \begin{bmatrix} r_x \\ r_y \\ r_z \end{bmatrix} - \begin{bmatrix} \hat{v}_{bx,n+1} \\ \hat{v}_{by,n+1} \\ \hat{v}_{bz,n+1} \end{bmatrix} \right)$$

It is noted that in practice, the speed error also allows the orientation to be corrected.

When the foot leaves the contact with the ground, the attitude and the speed are once again only updated on the basis of the measured values of the acceleration and of the angular speed provided by the means 20. The errors in calculation of the speed caused by the double integration of the accelerometers are thus reset at each step.

Calculation of the Moment Arm

It is noted that the length of the moment arm can be a constant inputted by the user (if necessary after measurement).

But alternatively, the exact position of the case 2 on the leg is not necessarily known thus $\vec{r}$ can be unknown a priori. In this case, the method advantageously comprises a prior step (a0) of determining said moment arm. Moreover, it is noted that the case 2 can move slightly along the lower limb 10, and thus the step (a0) can be implemented again (at regular intervals or upon instructions of the pedestrian 1) during the walking in order to re-determine $\vec{r}$.

It is indeed possible to estimate the value of this vector either separately or by directly integrating $\vec{r}$ into the state of the Kalman filter. If it is supposed that the inertial-measurement means 20 are mounted in such a way that the axis z is aligned with the axis of the leg, the moment arm $\vec{r}$ can be considered to be aligned with the axis z and the x and y coordinates are zero:

$$\begin{bmatrix} r_x \\ r_y \\ r_z \end{bmatrix} = \begin{bmatrix} 0 \\ 0 \\ r_z \end{bmatrix}$$

In particular, the vector product giving the speed becomes:

$$\begin{bmatrix} \omega_x \\ \omega_y \\ \omega_z \end{bmatrix} \wedge \begin{bmatrix} r_x \\ r_y \\ r_z \end{bmatrix} = \begin{bmatrix} \omega_x \\ \omega_y \\ \omega_z \end{bmatrix} \wedge \begin{bmatrix} 0 \\ 0 \\ r_z \end{bmatrix} = \begin{bmatrix} \omega_y \cdot r_z \\ -\omega_x \cdot r_z \\ 0 \end{bmatrix}$$

By adding a field $r_z$ to the state of the extended Kalman filter, a resetting of $r_z$ is carried out according to the error in measured speed at each foot on the ground phase.

Alternatively, $\vec{r}$ can also be directly estimated when the foot is in contact with the ground. It was explained that this phase can be determined for example on the basis of the impact undergone when the foot touches the ground, or this is a predetermined interval in which the user deliberately places the foot in contact with the ground.

During this phase, it was explained that the measurement of the accelerometer is given by:

$$\vec{a} = \frac{d\vec{\omega}}{dt} \wedge \vec{r} + \vec{\omega} \wedge \vec{\omega} \wedge \vec{r}$$

$$\begin{bmatrix} a_x \\ a_y \\ a_z \end{bmatrix} = \left( \begin{bmatrix} \frac{d\omega_y}{dt} \\ -\frac{d\omega_x}{dt} \\ 0 \end{bmatrix} + \begin{bmatrix} \omega_x \cdot \omega_z \\ \omega_y \cdot \omega_z \\ -\omega_x^2 \cdot r_z - \omega_y^2 \end{bmatrix} \right) \cdot r_z$$

The value of $r_z$ that minimises, on average, the following quantity can thus be sought:

$$\left| \vec{\gamma} - \left( \begin{bmatrix} \frac{d\omega_y}{dt} \\ -\frac{d\omega_x}{dt} \\ 0 \end{bmatrix} + \begin{bmatrix} \omega_x \cdot \omega_z \\ \omega_y \cdot \omega_z \\ -\omega_x^2 \cdot r_z - \omega_y^2 \end{bmatrix} \right) \cdot r_z \right| - |\vec{g}|$$

Finally, if the orientation of the inertial-measurement means 20 is not known, the three coordinates of the moment arm can be added to the filter. The reset then relates to the three coordinates.

The position of the means 20 on the lower limb 10 can also be estimated via the complementary use of other sensors when they are available, for example a GPS giving a speed and the orientation of the measurement unit with respect to the Earth, the unknown then being the moment arm, or a vision system giving a speed and the orientation. According to the precision of the information with regard to the exact speed at the sensor, a more or less long filtering time is necessary.

Results

Figure 4A:
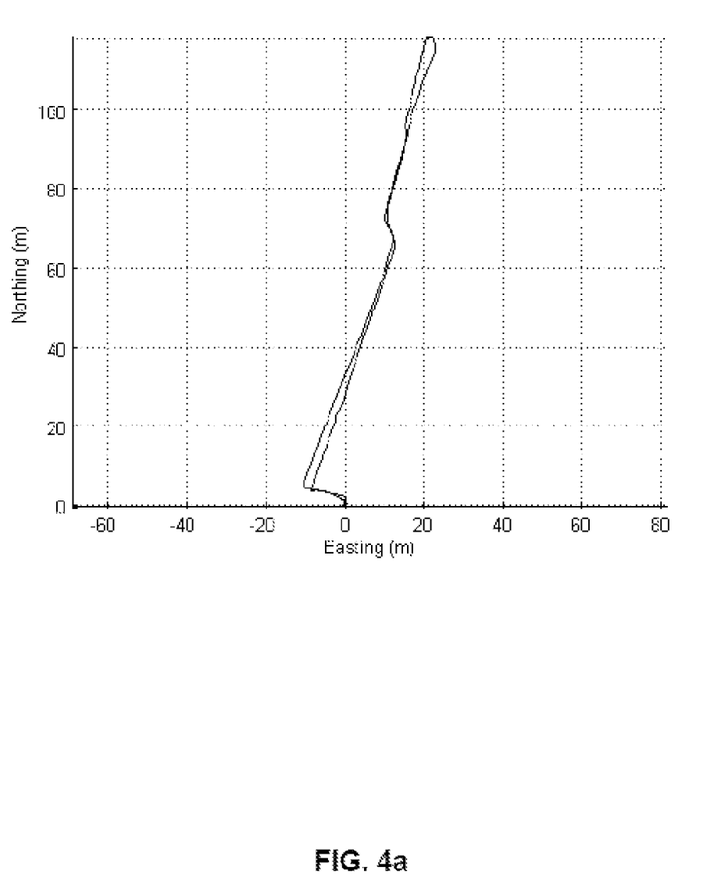
FIGS. 4a-4b show examples of results of estimation of the movement of a pedestrian obtained via the implementation of the method according to the invention.

FIG. 4a shows an example of a trajectory obtained after integration of the measurements of a case 2 carried above the ankle 12. The walk consists of a return journey in a street with a descent and then ascent of two stairs. The accelerometers and the gyrometers used in the means 20 are precisely calibrated MEMS sensors. An extended Kalman filter was used with resetting using the model of the moment arm when the foot is on the ground as described above.

The absence of deviation over a walk of several hundred metres (the pedestrian 1 comes back to the exact starting point) and the quality and the precision of the navigation are observed.

Figure 4B:
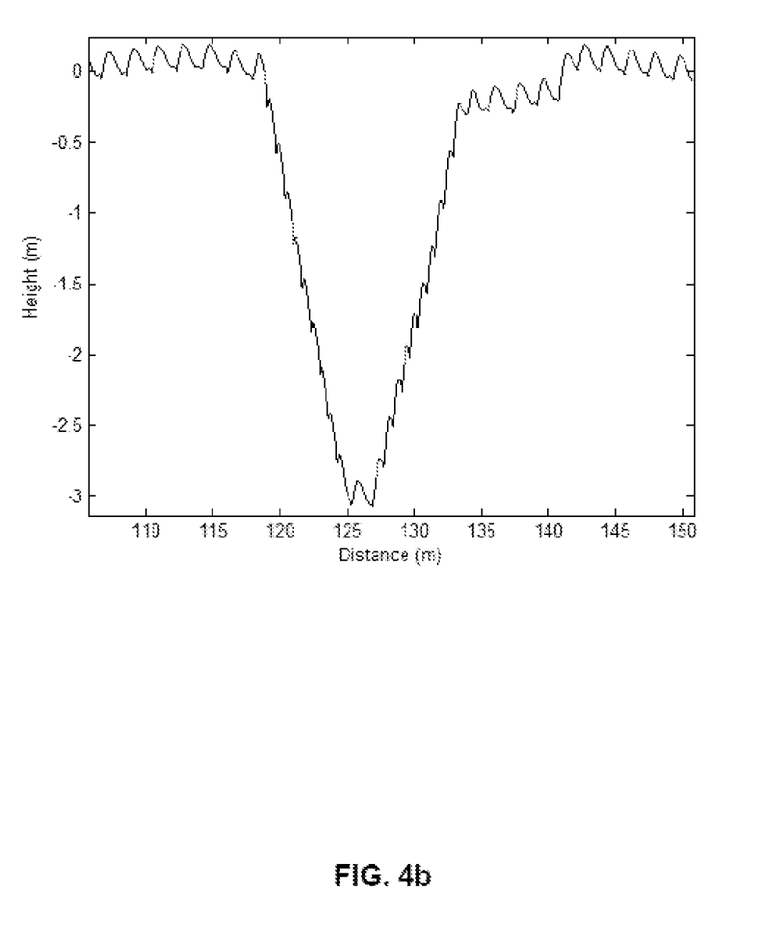

FIG. 4b more precisely shows the descent and ascent of the stairs during the walk illustrated in FIG. 4a. Here, the height of the case 2 according to the distance covered is shown. Each stride on flat ground is distinctly recognised, the ankle 12 rising by approximately 18 cm while following a curved trajectory. During the descent of the stairs between the distances labelled 118m and 125m, each stride is recognised, the foot 11 clearing two steps over a height of approximately 30 cm. Likewise, between the distances labelled 128m and 132m, for each stride, the clearing of two steps is recognised.

Thus, even though the environment is very problematic for a magneto-inertial measurement unit (ascent and descent of stairs, instead of remaining on flat ground), it is noted that the quality provided by the present method remains irreproachable.

The latter is optimal for monitoring the trajectory of a pedestrian 1 in a zone not at all or only slightly covered by a GPS signal, inside buildings, underground, near high walls, in the forest, etc.

As explained above, such a view showing the elevation of the means 20 for each step allows walking disorders to be easily detected.

Equipment and System

According to a second aspect, the invention relates in particular to the equipment 2, 3, 4 for implementing one or the other of the embodiments of the method.

As explained above, according to a first embodiment, the equipment is an autonomous case 2 comprising the inertial-measurement means 20 and the data-processing means 21 configured to implement the steps of the method.

The case 2 further comprises means 23 for attaching the case 2 to the lower limb 10, and if necessary a magnetometer 24, data-storage means 22 (for storing the acceleration/angular speed measured or the estimated movements) and/or communication means 25 for exporting the results.

According to a second embodiment, the equipment is a mobile terminal 3 or a server 4, suitable for communicating with a case 2 comprising the inertial-measurement means 20. In other words, the terminal 3 or the server 4 comprises the processing means 31 or 41 configured to implement the steps of the method. Each case 2 can nevertheless comprise data-processing means 21 for controlling the means 20 and for the transmission (via communication means 25) of the measured data to the data-processing means 31, 41.

It should be noted that the means 21, 31, 41 can, if necessary, share steps of the method. For example, in the case of a medical use, the processing means 21 of the case 2 can carry out the steps until (e), and a posteriori, the means 41 of the server 4 implement the step (f) of analysis in order to identify a possible disorder in the walking of said pedestrian 1.

In this case, the invention also relates to the system comprising the equipment 3, 4 according to this embodiment and the connected "satellite" case(s) 2

In all cases, the data-processing means 21, 31, 41 of the "main" piece of equipment 2, 3, 4 are configured to implement:

- A module for receiving an acceleration and an angular speed of a lower limb 10 of said pedestrian 1 acquired by inertial-measurement means 20 rigidly connected to said lower limb 10 and positioned in such a way as to have substantially a movement of rotation with respect to a distal end 11 of said lower limb 10 at least when said distal end 11 of the lower limb 10 is in contact with the ground;
- A module for estimating a speed of said lower limb 10 according to said measured acceleration and said measured angular speed;
- A module for determining a time interval of said walking of the pedestrian 1 during which said distal end 11 of said lower limb 10 is in contact with the ground according to the measured acceleration, the measured angular speed, and a moment arm between the inertial-measurement means 20 and said distal end 11;
- A module for calculating, in said determined time interval, an expected speed of said lower limb 10 according to said measured angular speed and said moment arm;
- A module for correcting, in said time interval, the estimated speed of said lower limb 10 according to the expected speed;
- A module for estimating the movement of the pedestrian 1 according to the estimated speed of said lower limb 10.

Computer Program Product

According to a third and a fourth aspect, the invention relates to a computer program product comprising code instructions for the execution (in the processing means 21, 31, 41) of a method for estimating the movement of a walking pedestrian 1 according to the first aspect of the invention, and storage means readable by a piece of computer equipment (for example data-storage means 22) on which this computer program product is located.

The invention claimed is:

1. A method for estimating the movement of a walking pedestrian, wherein the method comprises the following steps:
   (a) acquisition, by an inertial-measurement unit rigidly connected to a lower limb of said pedestrian and positioned in such a way as to have substantially a movement of rotation with respect to a distal end of the lower limb, wherein said distal end is a heel of a foot of said pedestrian, at least when said distal end of the lower limb is in contact with the ground, of an angular acceleration and of an angular velocity of the lower limb;
   (b) estimation, by a data-processor, of a speed of the lower limb according to said measured angular acceleration and said measured angular velocity;
   (c) determination, by the data-processor, of a time interval of said walking of the pedestrian during which said distal end of the lower limb is in contact with the ground according to the measured angular acceleration, the measured angular velocity, and a moment arm between the inertial-measurement unit and said distal end;
   (d) in said determined time interval:
   calculation, by the data-processor, of an expected speed of the lower limb according to said measured angular velocity and said moment arm;
   correction, by the data processor, of the estimated speed of the lower limb according to the expected speed;
   (e) estimation, by the data-processor, of the movement of the pedestrian according to the estimated speed of said lower limb.

2. The method according to claim 1, wherein the speed of said lower limb is estimated by integration of the measured angular acceleration expressed in a terrestrial reference frame according to the measured angular velocity, and the movement of said lower limb is estimated by integration of the estimated speed.

3. The method according to claim 1, wherein said expected speed is given by the formula $\vec{v}_{att} = \vec{\omega} \wedge \vec{r}$, where $\vec{\omega}$ is the measured angular velocity and $\vec{r}$ is the moment arm.

4. The method according to claim 1, wherein said inertial-measurement unit is positioned on said lower limb between an ankle and a knee.

5. The method according to claim 1, wherein step (c) comprises the calculation, by the data-processor, of an expected acceleration according to said measured angular velocity and the moment arm, said time interval of said walking of the pedestrian during which said distal end of said lower limb is in contact with the ground being determined according to the measured angular acceleration and said expected acceleration.

6. The method according to claim 5, wherein said time interval of said walking of the pedestrian during which said distal end of said lower limb is in contact with the ground is determined in step (c) as that during which a difference between the measured angular acceleration and the expected acceleration is less than a predetermined threshold.

7. The method according to claim 5, wherein said expected acceleration is given by the formula $$\vec{\gamma_{att}} = -\vec{g} + \frac{d\vec{\omega}}{dt} \wedge \vec{r} + \vec{\omega} \wedge \vec{\omega} \wedge \vec{r},$$

where $\vec{\omega}$ is the measured angular velocity, $\vec{r}$ the moment arm and $\vec{g}$ the acceleration of gravity.

8. The method according to claim 1, wherein said time interval of said walking of the pedestrian during which said distal end of said lower limb is in contact with the ground is determined in step (c) as that during which the measured angular acceleration and/or the measured angular velocity correspond to a predetermined pattern representative of the contact of the end of the lower limb.

9. The method according to claim 1, wherein the correction of an estimated speed of said lower limb in step (c) comprises the implementation of a filter that estimates a linear or non-linear state.

10. The method according to claim 1, comprising a prior step (a0) of determining said moment arm.

11. The method according to claim 10, wherein the moment arm is determined by minimising the difference between the measured angular acceleration and an expected acceleration dependent on said measured angular velocity and the moment arm, during a predetermined time interval of said walking of the pedestrian during which said distal end of said lower limb is in contact with the ground.

12. The method according to claim 9, wherein said determination of the moment arm comprises the integration of the moment arm into the filter.

13. A piece of equipment for estimating the movement of a walking pedestrian, wherein it comprises a data-processor configured to implement:
 a module for receiving an angular acceleration and an angular velocity of a lower limb of said pedestrian acquired by an inertial-measurement unit rigidly connected to said lower limb and positioned in such a way as to have substantially a movement of rotation with respect to a distal end of said lower limb, wherein said distal end is a heel of a foot of said pedestrian, at least when said distal end of the lower limb is in contact with the ground;
 a module for estimating a speed of said lower limb according to said measured angular acceleration and said measured angular velocity;
 a module for determining a time interval of said walking of the pedestrian during which said distal end of said lower limb is in contact with the ground according to the measured angular acceleration, the measured angular velocity, and a moment arm between the inertial-measurement unit and said distal end;
 a module for calculating, in said determined time interval, an expected speed of said lower limb according to said measured angular velocity and said moment arm;
 a module for correcting, in said time interval, the estimated speed of said lower limb according to the expected speed;
 a module for estimating the movement of the pedestrian according to the estimated speed of said lower limb.

14. The piece of equipment according to claim 13 that is a case comprising the inertial-measurement unit.

15. The piece of equipment according to claim 14, further comprising means for attaching the case to the lower limb, a magnetometer, and a communication unit.

16. The piece of equipment according to claim 13 that is a mobile terminal or a server, suitable for communicating with a case comprising the inertial-measurement unit.

17. The piece of equipment according to claim 16 and at least one case connected together.

18. A non-transitory computer readable medium comprising code instructions for the execution of a method for estimating the movement of a walking pedestrian according to claim 1.

* * * * *